April 10, 1934.   J. R. WILLIAMS   1,954,305
TESTING DEVICE FOR ELECTRICAL APPARATUS
Filed May 5, 1930   8 Sheets-Sheet 2
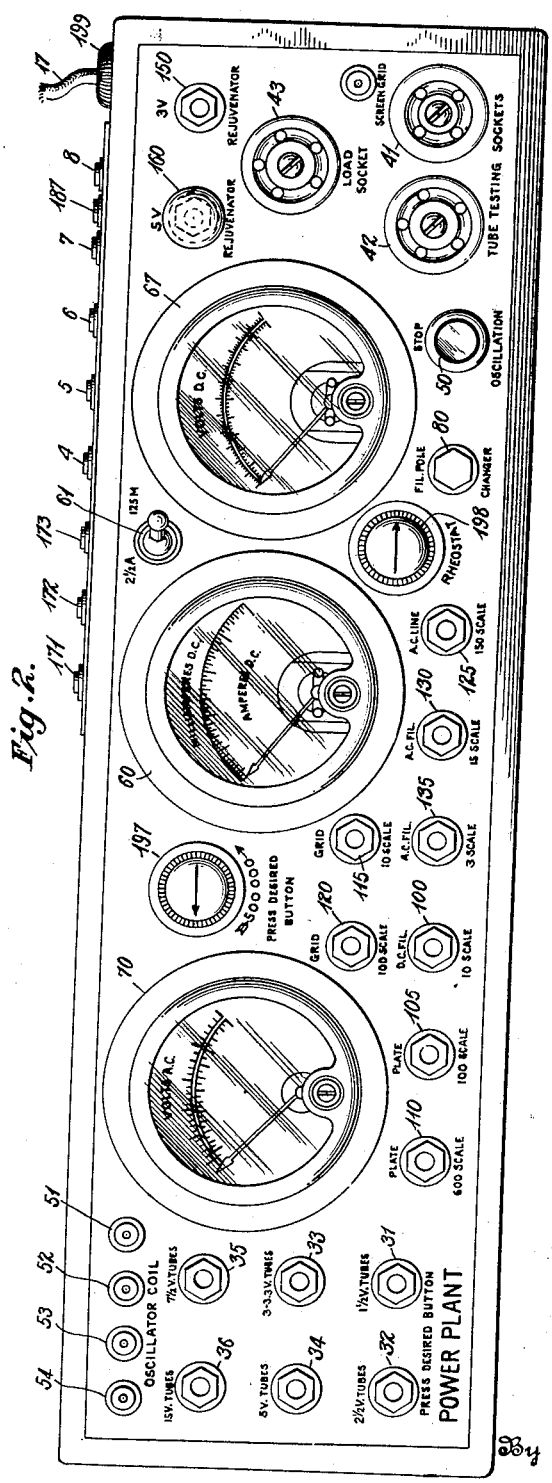
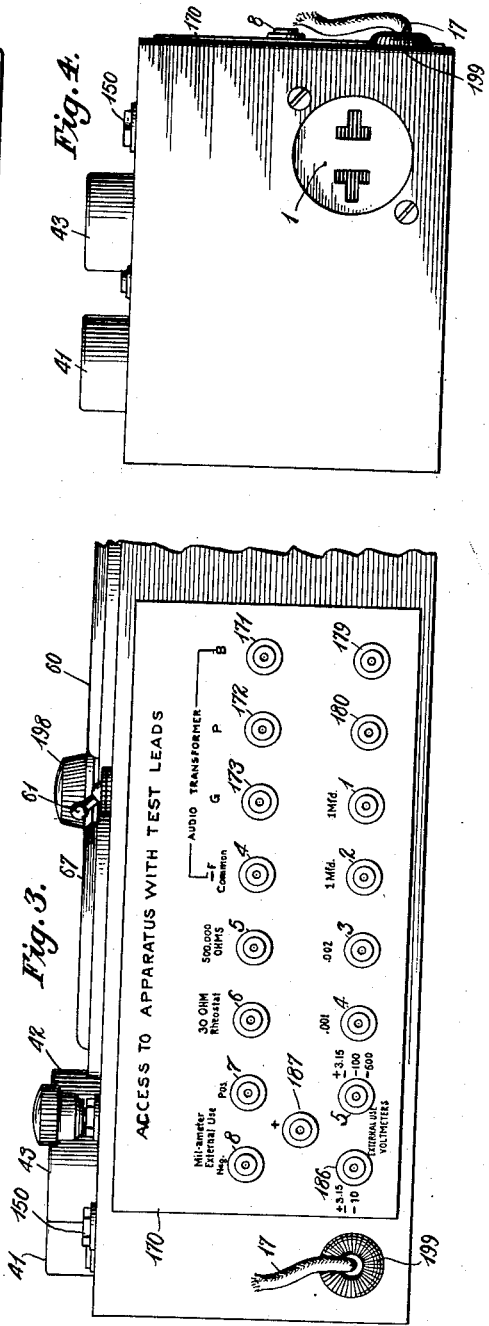
Inventor
Jewell R. Williams
Attorney April 10, 1934. J. R. WILLIAMS 1,954,305
TESTING DEVICE FOR ELECTRICAL APPARATUS
Filed May 5, 1930 8 Sheets-Sheet 3
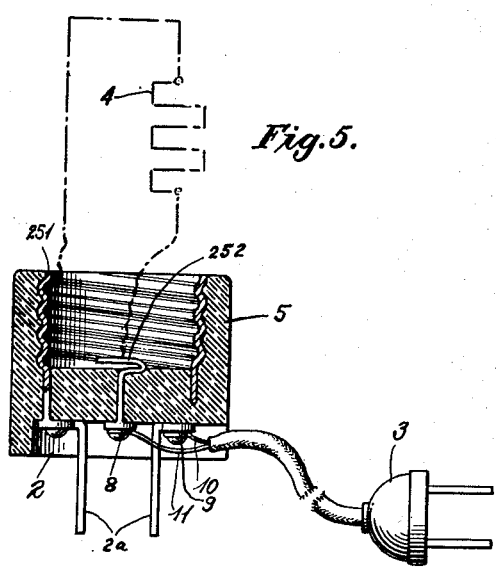
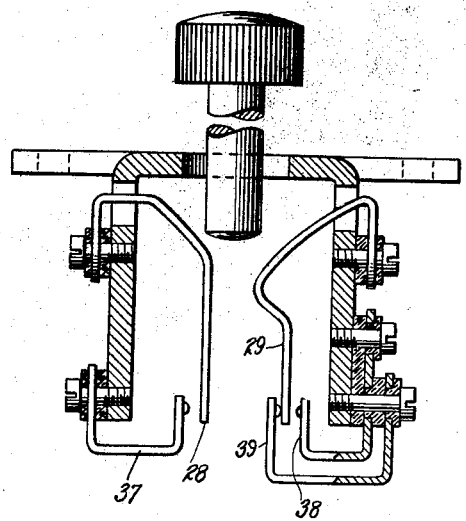
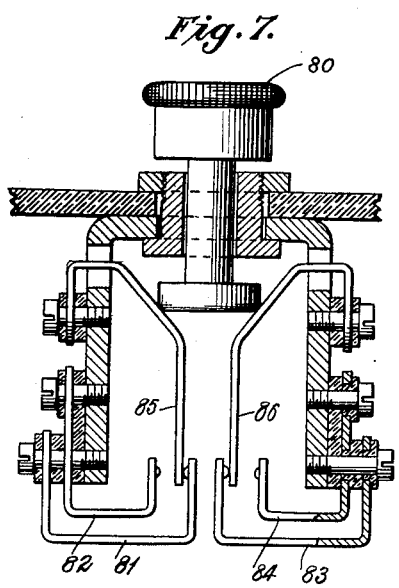
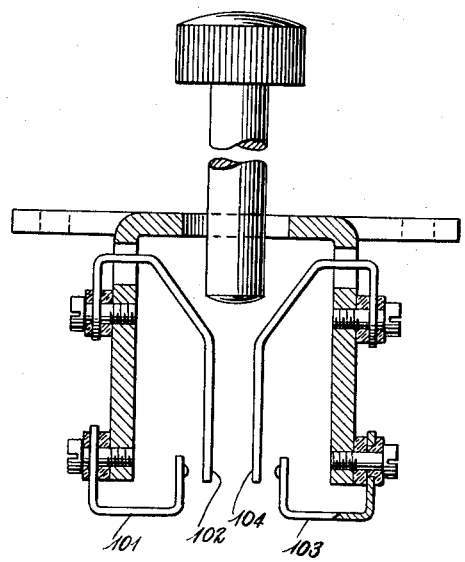
Inventor
Jewell R. Williams
By
Knight Bro
Attorney April 10, 1934.　　　J. R. WILLIAMS　　　1,954,305
TESTING DEVICE FOR ELECTRICAL APPARATUS
Filed May 5, 1930　　　8 Sheets-Sheet 4

Inventor
Jewell R. Williams

By Knight Bros
Attorneys

Inventor
Jewell R. Williams

By Knight Bros
Attorneys

April 10, 1934.   J. R. WILLIAMS   1,954,305
TESTING DEVICE FOR ELECTRICAL APPARATUS
Filed May 5, 1930   8 Sheets-Sheet 6

Inventor
Jewell R. Williams
By
Knight Bros
Attorneys

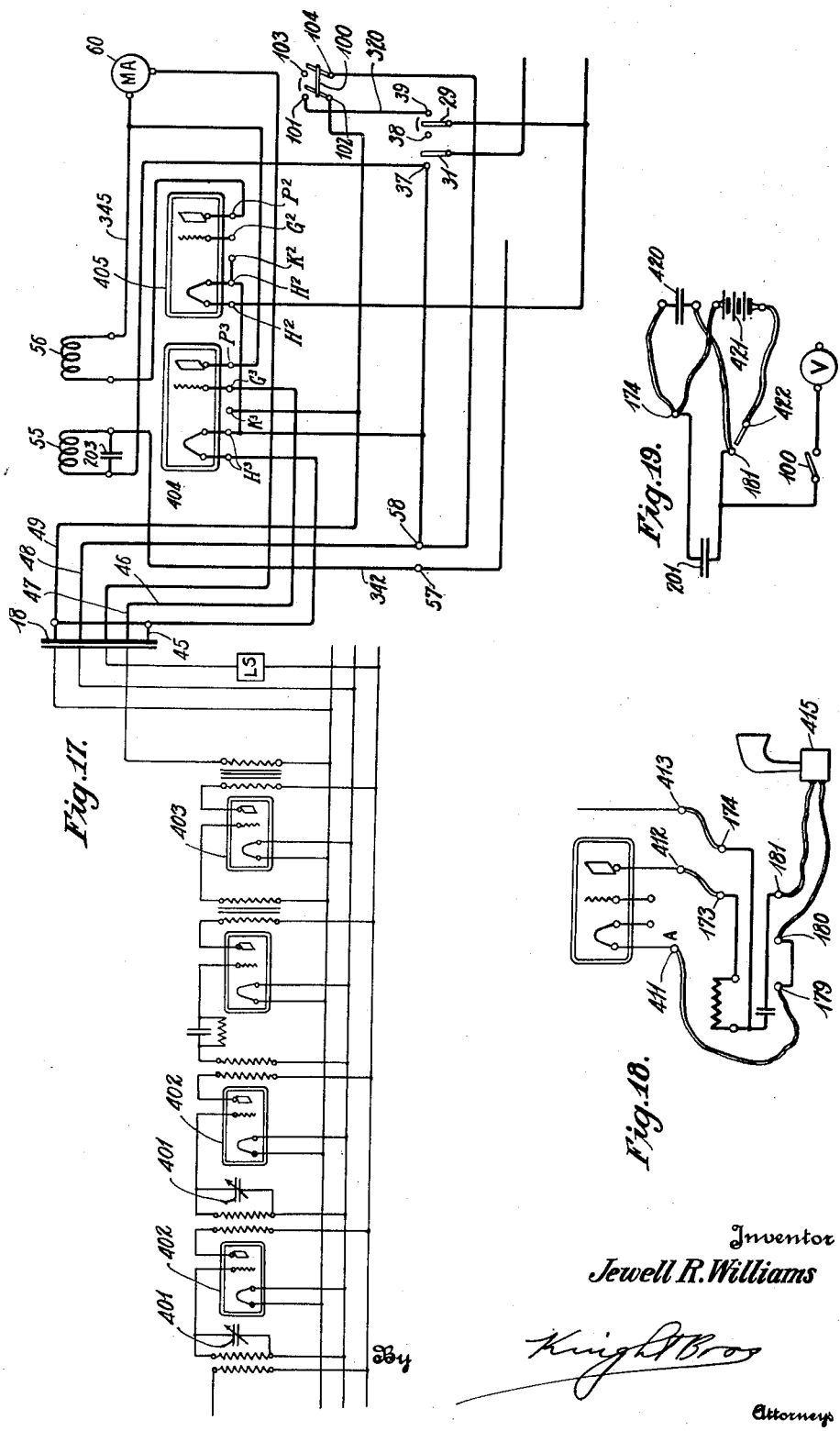

Patented Apr. 10, 1934

1,954,305

UNITED STATES PATENT OFFICE 1,954,305

TESTING DEVICE FOR ELECTRICAL APPARATUS

Jewell R. Williams, Greenwood, Miss., assignor to Supreme Instruments Corporation, Greenwood, Miss.

Application May 5, 1930, Serial No. 449,971

14 Claims. (Cl. 250—20)

This invention relates to devices for the testing and conditioning of high frequency apparatus including electron discharge devices, and particularly to the so-called servicing of radio communication devices.

Difficulties are often encountered in testing, adjusting and conditioning such apparatus, especially where this servicing has to be performed at places where no special means therefor are available and where comparatively unskilled persons are to perform in a reasonably short period of time the delicate operations involved in such servicing.

It is therefore the general object of the present invention to provide a compact, light-weight, easily transportable, sturdy, and not too expensive testing and servicing device which permits, in spite of simple and easily comprehensible operation, the taking of all tests considered necessary in connection with radio devices or similar high frequency apparatus, and in addition means to detect and eliminate various deficiencies occurring in such apparatus and its electron discharge tubes, commonly known as audion tubes.

For a number of years the only available commercial method of testing electron discharge tubes was what is called the "grid bias" method, which consisted in measuring the filament emission current by means of a meter in the plate circuit, first with a "zero grid" or grid having no voltage impressed upon it, and then with a "biased grid". To bias the grid a low direct current voltage was impressed upon it, with the result that the grid repelled some of the electrons discharged from the filament and less plate current flowed, as shown by the meter. In another method a variable grid bias was obtained by connecting the grid successively to different points in the plate or filament circuits, which were supplied by a source of alternating current. None of these methods told the actual working conditions of a tube, but were accepted because a better method was not available.

It is therefore a primary object of my invention to provide a method of testing by which the actual working conditions of a tube can be determined and compared with the working conditions of a standard tube. I have found that by testing the oscillation and emission currents of a tube and comparing them with those of a standard tube of the same type, a reliable diagnosis of the quality of the tube can be made, enabling the tester to determine whether it should be discarded or rejuvenated, and for what particular part of a circuit it is best suited.

A further object is the provision of a servicing device which permits the testing with high frequency current of radio tubes requiring various voltages, the supply current being converted to the proper voltage by a transformer with tapped secondary and corresponding selecting switches.

A further object is the provision of a simple oscillatory circuit especially suited for the purposes of my testing device.

A further object is the provision of an oscillatory circuit the filament, grid, and plate circuits of which are supplied with alternating current from a commercial low frequency supply, the phase of the alternating current voltage impressed on the grid being changeable, not to vary the emission current, but to change the oscillation saturation point of the tube.

A further object is the provision of an oscillatory circuit for carrying out my method of testing electron discharge tubes, which can be supplied with operating current from a radio communication device.

A further object is the provision of an arrangement whereby the tubes of a radio communication device or other high frequency apparatus can be transferred to the testing device, by maintaining the original connections and at the same time establishing connections with the various circuits of the testing device.

A further object is the provision of arrangements for making continuity tests by using commercial alternating current in manners which are not dangerous to the operator and by using as indicators the measuring instruments of the testing device.

A further object is the provision of methods and of circuits for aligning or balancing the condensers of a plurality of inter-related oscillatory circuits, as for instance, the radio frequency amplification circuits of a radio broadcast receiving device.

A further object is to provide an oscillatory circuit having an inductance coil adapted to radiate modulated waves within a limited area for the purpose of testing radio devices with respect to their general operativeness, in case no other radiated energy should be available.

A further object is the provision of apparatus for the rejuvenating of radio tubes, in connection, and inter-related, with a servicing device for testing high frequency apparatus and electron discharge tubes.

A further object is the provision of apparatus for the rejuvenating of radio tubes whereby a plurality of series of flash and cooking voltages can be applied to the same tube socket for different kinds of tubes.

A further object is the provision of a rejuvenating device which permits the rejuvenating in one socket of tubes requiring various filament voltages whereby only one special plug switch is employed for the whole rejuvenating process of each tube of a certain filament voltage, characteristic positions of the special plug corresponding to the flashing and cooking voltages, and which also secures reliable disconnection of the rejuvenating circuit when not used.

A further object is a provision for the rejuvenating of a comparatively large number of tubes by connecting my servicing device to a plurality of interconnected sockets or other receiving means for said tubes, the rejuvenating operation being controlled from my device.

A further object is the provision of a circuit of a stage of audio frequency in my testing device, this circuit being adapted for insertion in a radio communication device.

A further object is the provision of a testing device containing the instruments and other apparatus for carrying out the operations herein described, each of these instruments or apparatus being part of each circuit wherein they might be needed, but avoiding duplication of parts, whereby an extreme degree of compactness is obtained.

A further object is the provision of a servicing device for radio apparatus which uses plug spring switches or push button switches, each of such switches being provided for a specific operation, thereby facilitating the use of the device by unskilled operators.

A further object is the provision of a servicing device which permits at any time the reading of the voltage of the alternating current supply as soon as the apparatus to be tested or treated is connected to the device.

A further object is the provision of an inductance coil arrangement for my servicing device, this arrangement consisting of a coil having pin contacts corresponding to pin jacks of my servicing device, this arrangement permitting removal of the coil for easy packing and transportation and at the same time interruption of the oscillatory circuit.

A further object is the provision of a servicing device which has testing and conditioning circuits supplied from a commercial alternating current source and provisions for the convenient use of protecting resistances in the supply circuit.

A further object is the provision of a servicing device containing volt, milliampere, and ampere meters and a series of contact spring switches adapted to connect these instruments for the desired readings, each switch being related to a definite reading of each instrument.

A further object is the provision of a servicing device which contains an inductive output circuit as used in radio communication apparatus and means whereby this circuit can be conveniently inserted into such apparatus.

A further object is the provision of a servicing device which contains a condenser-choke coil output circuit as used in radio communication apparatus and means for conveniently connecting the circuit to such an apparatus.

A further object is the provision of a servicing device which contains circuits permitting the testing of condensers for break down.

A further object is the provision of a servicing device which contains several condensers arranged in such a manner that they can be used externally, separately or in various combinations, apart from the other circuits of the device.

A further object is the provision of a servicing device containing measuring instruments and other apparatus which can be used, not only in connection with the circuits of the device, but also independently of those circuits for any purpose for which they might be appropriate, connections being provided for this purpose.

A further object is the provision of a servicing device which contains several variable resistances arranged in such a manner that they can be used externally apart from the other circuits of the device.

Other objects of my present invention will be apparent to those skilled in the art from the following description and the appended claims.

In the drawings accompanying the descriptions,

Fig. 2 is a top view of the cabinet containing my device,

Fig. 3 is a partial rear view thereof,

Fig. 4 is a side view thereof,

Fig. 5 is a schematical sectional view of the series resistance plug used in connection with my device, the resistance being indicated in dotted lines, Fig. 6 is a view of a power switch, partially in section, Fig. 7 is a view of a pole changer switch, partially in section, Fig. 8 is a view of a spring switch partially in section.

Fig. 17 is a diagram of the circuit for "aligning condensers", Fig. 18 is a diagram of the "condenser-choke coil output circuit", and Fig. 19 is a diagram of the circuit for testing condensers.

The same reference characters are employed to identify like parts in different drawings.

Figure 1:
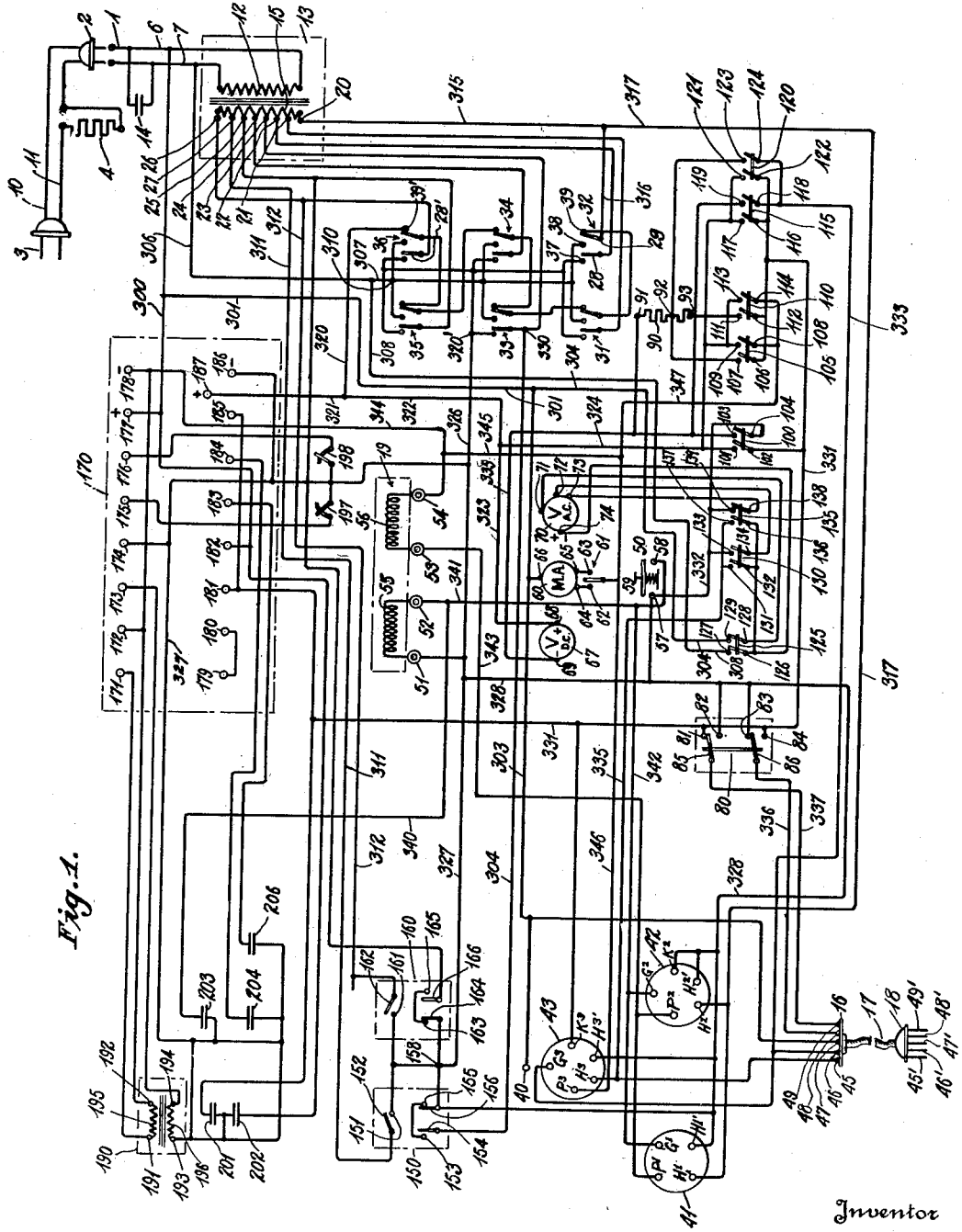
Fig. 1 is a complete diagram of my servicing device.

Referring now particularly to Fig. 1, the elements of the device forming the present invention and their general arrangement will be described.

1 is a contact receptacle adapted to receive a conventional connector 2, for instance, in the form of a plug, which is connected to a commercial alternating current outlet by any convenient means, for example, an ordinary plug 3, in series with a protecting resistance 4. Connector 2 may be designed in such a manner as to permit insertion of the current limiting resistance as, for instance, an incandescent lamp or any other resistance having lamp socket contacts. In the series resistance plug shown in Fig. 5, 5 is a supporting body of insulating material, 2a are contact pins, 251 is a screw contact and 252 a spring contact, 251 and 252 being similar to the contacts of a normal lamp socket; 8 and 9 are terminals to which conductors 10 and 11 leading to plug 3 are connected. The arrangement described has the advantage that the connection from the testing device to the alternating current supply cannot be normally established without inserting a protective device.

12 is the primary winding of a transformer 13, the terminals of winding 12 being connected by leads 6 and 7 to the contacts of receptacle 1. A condenser 14 is connected across the primary winding 12. 15 is the secondary winding of power transformer 13, having an end terminal 20 and a number of tap terminals, seven in this particular case, which are denoted by numerals 21, 22, 23, 24, 25, 26 and 27.

31, 32, 33, 34, 35, and 36 are composite switches, in the following being referred to as "power switches", each one consisting of three contacts 37, 38, 39, and switching elements 28 and 29, to be referred to as tap switches (28) and coupling switches (29). These switches are shown in Fig. 1 in a conventional form, whereas I prefer so-called spring jack switches for actual use, as shown in Fig. 6, wherein corresponding numerals are used for corresponding contacts, 37, 38 and 39 being fixed contacts and 28 and 29 movable spring contacts. The connections of these power switches will be described later on, together with the other connections. I prefer to use only spring, or so-called jack switches with my device for the following reasons: They do not expose any current carrying parts at the outside of the cabinet, they require the least amount of panel surface in comparison with other switches, they have definite positions depending upon whether or not the corresponding plug is inserted or not, or the corresponding push button is pressed down or not. For this reason they are particularly well adapted for a device of this kind and permit, if properly connected, an easily comprehensible and positively defined way to establish the necessary connections for the selection of certain circuits from a plurality of circuits or apparatus and connections.

It is immaterial whether the spring contacts of these switches are operated by plungers or push button operated bodies. In Fig. 7 a push button operated switch is shown by way of example, whereas the contacts shown in Fig. 8 are closed with a plunger of insulating material.

Referring especially to the power switches of Fig. 6, contacts 28 and 37, and 29 and 38 respectively will be open and contacts 29 and 39 closed if the switch is inoperative, that is, if the plunger is not inserted, and contacts 28 and 37, and 29 and 38 respectively are closed and 29 and 39 open if the plunger is inserted.

A number of receiving devices for electron discharge apparatus with different connecting means are provided for tubes to be tested, or to be used in testing circuits, which will be referred to as "testing sockets". In this particular case, two of such receptacles or sockets are shown, 41 with four contacts and 42 with five contacts. Another socket 43 to be referred to as "load socket" is also provided. The contacts of these sockets, to be called "socket contacts", are denoted as $P_1$, $G_1$, $H_1$, $H_1'$ for the contacts of socket 41; $P_2$, $G_2$, $K_2$, $H_2$ and $H_2'$ for the contacts of socket 42, and $P_3$, $G_3$, $K_3$, $H_3$ and $H_3'$ for the contacts of socket 43, in conformity with the marks actually used on commercial tube sockets.

16 is a contact device with five terminals 45, 46, 47, 48 and 49 to be referred to as "plug contacts", which are connected to five conductors 80 of a flexible cord 17, which is connected at its other end to a plug 18 with five pins or prongs 45', 46', 47', 48' and 49' to be referred to as "five prong plug".

51, 52, 53 and 54 are spring contacts, to be called "oscillator contacts", adapted to receive the pin contacts of an inductance device which is indicated symbolically by coils 55 and 56 and referred to as "oscillator".

50 is a push button switch to be referred to as "stop oscillation switch", with two contacts 57 and 58, and a connecting switch member 59.

60 is a milliampere meter for a plurality of ranges, two in this particular case. By means of switch 61 with contacts 62 and 63, either of these two ranges can be used. Contacts 62 and 63 are connected to meter terminals 64 and 65, corresponding to the two ranges, whereas 66 is the other terminal of the ampere meter. 67 is a direct current volt meter with a positive terminal 68 and a negative terminal 69. 70 is an alternating current volt meter with three contacts 71, 72 and 73 corresponding to three ranges, "low", "medium" and "high", and connected to contacts 128, 134 and 138 of spring switches 125, 130 and 135. 74 is the other contact of the alternating current volt meter.

80 is a pole changer with four contacts 81, 82, 83 and 84 and two switching members 85 and 86. This switch is again shown in a conventional form, but actually a spring switch as shown in Fig. 7 will be used, whereby the switching members 85 and 86 will be normally in contact with the fixed contacts 81 and 83 but are connected to 82 and 84 so long as knob 80 is pressed.

100, 105, 110, 115 and 120 are instrument switches for direct current measurements, and 125, 130 and 135 are instrument switches for alternating current measurements. Each of these switches is again shown in a conventional manner whereas spring switches as shown in Fig. 8 are actually used for reasons given above in connection with the description of the power switches. The fixed and movable contacts of these instrument switches are denoted by numerals corresponding to the numerals of the switches, as shown in the drawing.

Figure 9:
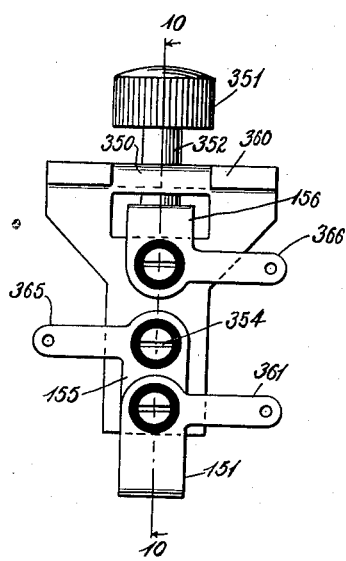
Fig. 9 is a front view of a rejuvenator switch.
Figure 10:
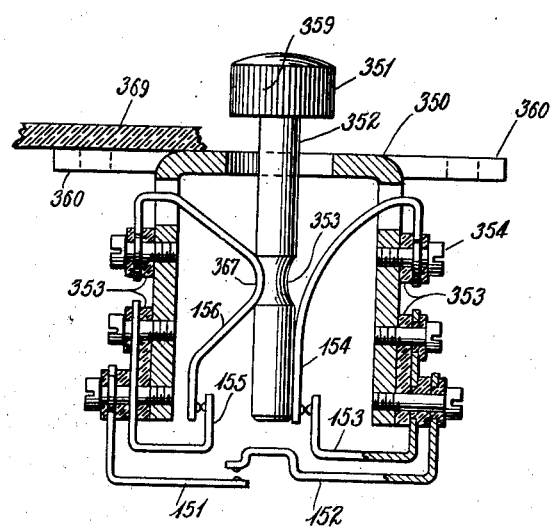
Fig. 10 is a sectional side view of the rejuvenator switch.

90 is a series resistance for the direct current volt meter, with three terminals 91, 92 and 93 corresponding to the three ranges of volt meter 62, and respectively connected to contacts 103, 107 and 111 of spring switches 100, 105 and 110 respectively. 150 and 160 are composite spring switches, to be called "rejuvenator switches", which are again conventionally shown but have the actual design such as shown in Figs. 9 and 10. In Figs. 1 and 9, the switches 150 and 160 have fixed contacts 151, 153, 155, and 161, 163 and 165 respectively, and three movable spring contacts 152, 154, 156, and 162, 164 and 166 respectively. The following contacts of these switches are directly connected: 151, 161, 156 and 164 at 158; 153 to 155; 163 to 165. The connections with the other apparatus of my testing device will be described later. 170 is a panel with various spring sockets for pin contacts. These spring sockets have numbers 171 to 187, as shown in Fig. 1, and will be referred to as "pin contacts". The connections leading to these pin sockets will be described later. 190 is a transformer with iron core, a so-called "audiotransformer", with two windings 195 and 196 and four terminals 191, 192, 193, and 194.

197 is a high resistance rheostat, in this case of approximately 500,000 ohms, and 198 is a low resistance rheostat, in this case of about 30 ohms.

201, 202, 203, 204 and 206 are condensers of various capacities. For the purpose of my testing apparatus I have found the following capacities as most useful: 201 and 202 with a capacity of 1 m. f.; 203 of .0005 m. f.; 204 of .001 m. f.; and 206 of .002 m. f. The connections of these condensers will be described later.

40 is a spring socket adapted to receive the pin contact of a lead from the special terminal of so-called screen grid tubes, to be referred to as "screen grid contact".

According to the purpose of my testing device, the parts enumerated above are mounted in and upon a cabinet which is adapted to be easily transported in a container.

The cabinet referred to above is shown in Figs. 2, 3 and 4, the numerals of these figures corresponding to those designating like parts in Fig. 1.

The parts of my device which have to be readily accessible, namely, the meters, the tube sockets, the rheostat knobs, the switches and push buttons are arranged on the top panel, whereas the pin socket panel with its contact devices is mounted on one of the side walls of the cabinet. The other parts, for which protection is desired rather than accessibility, as transformers, condensers, rheostats, etc. are mounted inside the cabinet. These two groups of apparatus are wired separately, the ends of the necessary connections between the two groups being brought to connectors, as for instance, of the type described and claimed in my co-pending application, Serial No. 394,094. The connectors are joined with semi-flexible conductors, thereby allowing the removal of the top panel without changing any of the connections, in order to make the parts inside the cabinet or upon the backside of the top panel accessible, if necessity to inspect these parts should arise.

Receptacle 1 for series resistance plug 2 may be mounted on a side wall of the cabinet, so as to correspond with an opening in one of the side walls of the carrying case referred to above, thereby permitting use of the servicing cabinet while it remains inside of said carrying case. The flexible cord 17 is brought out through a suitable fixture 199 near the pin socket panel 170, so that it can be easily stored away in a corresponding compartment of the carrying case. The pin socket panel 170 is mounted upon one of the long walls of the cabinet, at a place kept accessible in said carrying case, so that these pin contacts may also be used without removing the cabinet from the case.

Having now described the different elements of my device and their general arrangement with respect to the cabinet upon which they are mounted, I shall proceed to describe the connections between these elements.

In order to facilitate the tracing of the connections, I have denoted several of the main connections with numerals, while others will only be identified by the terminals which they join.

Lead 6 of the power transformer is connected over 300 to pin contact 177, pin contact 182 and condenser 202, over 301 and 303 to contact 66 of ampere meter 60, screen grid contact 40 and plug contact 47, and over 304 to contact 129 of instrument switch 125. Lead 7 is connected over 306 and 307 to contacts 38 of the power switches, and over 306 and 308 to contact 127 of instrument switch 125. It will be seen that all contacts 37 of the power switches 31 to 36 inclusive are interconnected, and that the same is true with respect to contacts 38 of these switches.

Each of the tap terminals 21 to 26 inclusive is connected to the corresponding contacts 28 of the tap switches of power switches 31 to 36 inclusive, whereas tap terminal 27 is directly connected over 311 to contact 152 of the rejuvenator switch 150. Tap terminal 26 is also connected over 312 to contact 162 of rejuvenator switch 160.

End terminal 20 of the secondary of the power transformer is connected over 315 to contact 29 of the coupling switch of power switch 32, and over 317 to socket contacts $H_1$ and $H_2$ of testing sockets 41 and 42.

Contact 39' of switch 36 is connected over 320 and 321 to pin contact 187, over 320, 322 and 324 to contact 101 of instrument switch 100, contacts 109 and 113 of instrument switches 105 and 110 and contacts 117 and 121 of instrument switches 115 and 120, and over 320, 322 and 323 to contact 68 of direct current volt meter 667.

Point 320' which is connected to the contacts 37 of the power switches 31 to 36 inclusive is connected over 326 on the one side over rheostats 197 and 198 to pin contacts 175 and 176, and also to pin contacts 186 and 174 and condensers 201, 202, 203, 204 and 206, end terminal 193 of audio transformer 190, and on the other side to oscillator contact 51, over 327 to point 158 of the rejuvenator arrangement and over 328 and contact 57 of the stop oscillation switch 50 to contacts 133, 139 and 104 respectively of instrument switches 100, 130, 135, and also to contacts 82 and 83 of pole changer 80 and further on from the pole changer over 328 to socket contacts $H_2'$ and $K_2$, and $H_1'$ of testing sockets 42 and 41 respectively and $H_3'$ of load socket 43.

From point 330 of power switch 33 which is connected to the tap switch contact of 33 and therefore to tap terminal 23 is connected over 304 to switching member 154 of rejuvenator switch 150.

The connections of the instrument switches, insofar as they have not been described before are as follows: Contact 102 of instrument switch 100 is connected to contact 106 of instrument switch 105, contact 112 of instrument switch 110, contact 116 of instrument switch 115, and contact 122 of instrument switch 120, and on the other side over 331 to contacts 82 and 83 of pole changer 80, socket contact $K_3$ of the load socket 43, pin contacts 181 and 185 and condenser 201. Contact 126 of instrument switch 125 is connected to terminal 74 of volt meter 70, whereas contacts 128, 134 and 138 respectively of instrument switches 125, 130 and 135 lead to the three other terminals, corresponding to its three ranges, of volt meter 70.

Plug contact 45 is connected to socket contact $H_3$ of load socket 43 and over 335 to contacts 131 and 137 of instrument switches 130 and 135 respectively, and also to prong 45' of the five-prong plug 18. Plug contact 46 is connected to socket contact $G_3$ of 43 and over 333 to contacts 118 and 124 of instrument switches 115 and 120 respectively, and also to prong 46'. Plug contact 47 is connected to lead 303 which has been already described in connection with lead 6 of the power transformer. Plug contact 48 is connected over 336 to switching member 86 of pole changer 80.

Plug contact 49 is connected over 337 to switching member 85 of pole changer 80.

The connection of oscillator contact 51 has been described before. Oscillator contact 52 is connected over 340 to condenser 203, over 341 to contact 58 of stop oscillation switch 50 and over 341 and 342 to socket contacts $G^1$ and $G^2$ of testing sockets 41 and 42. Oscillator contact 53 is connected over 343 to socket contacts $P^1$ and $P^2$ of testing sockets 41 and 42. Oscillator contact 54 is connected on the one side over 344 to pin contacts 178 and 172, and to terminal 192 of audio transformer 190, and on the other side over 345 and 346 to the movable contact of ampere meter switch 61 and socket contact $P^3$ of load socket 43, and over 345 and 347 to contacts 108 and 114 of instrument switches 105 and 110.

The connections of load socket 43 and testing sockets 41 and 42, the connections of rejuvenator switches 150 and 160 and the connections of audio transformer 190 are included in the previous description.

Condensers 204 and 206 are on the one side connected to condensers 201 and 202 and terminal 193 of audio transformer 190, as already described and on the other side to pin contacts 183 and 184 respectively. The other connections of the condensers have been described before.

The connections of the pin contacts have also been previously described with the exception of pin contacts 179 and 180 which are directly connected to each other.

Having described the elements of my device, their general arrangement and their connections, I shall now proceed to explain the circuits formed thereby and the manner in which they are established and operated.

*Testing of electron discharge apparatus.*—I have found that by measuring the electron emission current of an electron discharge device and its saturation plate current determined by its inherent capacity, mutual inductance, and full impedance, it is possible to detect the condition of such a tube with sufficient accuracy to determine its adaptability for a certain purpose. Radio tubes may be classified according to their adaptability for use in various parts of high frequency apparatus into three groups.

A "normal tube" is a tube the characteristics of which correspond to the manufacturer's standards. The oscillation and emission currents of such a tube, when measured with my servicing device, will be referred to as "normal values".

A "super-normal tube" is a tube which is superior in quality to a standard tube of the same kind, either in consequence of exceptional conditions in its manufacture or through appropriate treatment during use or through the so-called aging. Such tubes have increased oscillation currents accompanied by normal emission currents, or they may have both increased oscillation and emission currents, in comparison to the standard values of these currents. In the first case the tube will oscillate freely whereas in the second case the tube has softened, that is, the plate resistance has decreased; such tubes are especially useful as detectors.

A "sub-normal" tube is a tube which is inferior to a tube which conforms with the standard requirements. It was either defective upon leaving the factory or has been mistreated during operation. If it does not give an oscillation current and only a weak emission current, it has been "paralyzed", and can be re-activated provided it has a thorium filament. If it gives a slight oscillation current and a very small filament emission current, it is exhausted or nearly exhausted and has outlived its usefulness.

When the instrument is set for the oscillation test the plate coil feeds back inductively to the grid coil, a certain amount of energy, which is in turn impressed on the grid and again reimpressed on the plate and back again to the grid circuit. This regeneration would be unlimited except for the factors of the characteristics of the tube under test and the tube circuit constants. The amplitude of the wave of the alternating current or radio frequency swing is built up when it reaches the maximum permitted by the tube under test, or the point at which regeneration ceases. The quality of the tube is determined by measurement of the plate current pass without the impression of the radio frequency currents and after the impression of the radio frequency currents and the "building up of amplitude", or in other words, this measurement is taken at that point when the regeneration ceases owing to the limitation of the tube circuit constants; these measurements are compared with similar measurements taken on what are known to be normal tubes.

It will be seen from the foregoing that it is possible with my tube testing method, which forms part of this invention, to determine the condition of an electron discharge tube in a comparatively simple manner by measuring its oscillation and emission currents and by comparing them with corresponding normal values. In order to accomplish this test in a simple manner and independently of special power sources I have arranged in my servicing device a tube testing circuit which permits the use of the method described above in the following manner, referring now especially to Fig. 11: The tube to be tested is inserted in one of the testing sockets 41, 42, after the servicing device has been connected to a commercial alternating current supply by means of plug 3 and protecting resistance 4, as shown in Fig. 1. The line voltage can now be measured by inserting a plug in switch 125. In the following reference is always made to the closing of switches by inserting a plug; it is however understood that any other means of closing circuits may be employed as, for instance, by pressing the button of a spring switch as shown in Fig. 7. It is important to have a means for measuring the line voltage, which will vary at different places, for the following reason: The characteristic values for oscillation and emission current of standard tubes referred to above will vary for various plate and filament voltages and it is therefore necessary to measure the standard values for various voltages corresponding to the range of commercial voltages to be expected. A table giving the oscillation and emission currents of standard tubes for various voltages will be made and the readings of the tubes tested in my device compared with the values for standard tubes, in order to determine the condition of the tube which has been tested.

Figure 11:
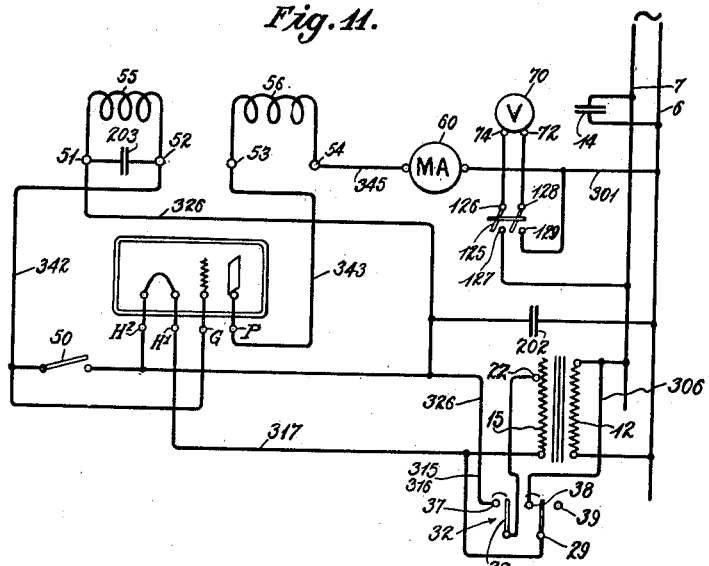
Fig. 11 is a diagram of the "tube testing" circuit.

The tube in the testing socket is then supplied with the proper filament voltage by inserting a plug in one of the six power switches 31 to 36 whereby the proper tap of the transformer secondary 15 is connected to the tube filament over switching element 28 of switch 32, for instance, as indicated in Fig. 11, the connection being, for example, referring now to Fig. 1, from tap 22 over contact 28 to contact 37 of switch 32, and from there over 326 to 51 and $H_1$, $H^{2\prime}$, and $K^2$.

At the same time contact 29 of power switch 32 closes a connection between lead 7 of transformer primary 12, and terminal 20 of secondary winding 15 over 38, 310 and 306, thereby partly closing the plate circuit, as shown in Fig. 11. The oscillator coils 55 and 56 are then inserted in the corresponding oscillator contacts 51, 52, 53 and 54, thereby closing the grid circuit over 342, 55 and 326, and the plate circuit over 343, 56, 345, milliampere meter 60 and conductor 301, to the lead 6 of the primary of transformer 13. In this manner the plate circuit is supplied with the full voltage across the primary 12 of transformer 13, whereas the filament is supplied with the appropriate voltage furnished by secondary 15 over tap switch 28 of the power switch corresponding to the particular filament voltage. The tube will now oscillate if it is able to do so at all, and the plate current can be read on the appropriate scale of milliampere meter 60, which can be selected with switch 61. In order to stop the oscillation and to read the emission current, filament and grid are connected by pressing "stop oscillation" switch 50 and the emission current can now be read on the appropriate scale of milliampere meter 60.

By using suitable tube adapters in connection with the two sockets 41 and 42 provided for this test, any kind of tube may be tested by means of the method described above, including two electrode detector tubes. For the so-called screen grid tubes, contact 40 is provided for connection with the screen grid terminal.

*Testing tubes from radio apparatus.*—This test can also be carried out by supplying my servicing device from the power source of a radio apparatus. This is especially valuable in cases where no commercial alternating current is available and the tubes have to be tested from the batteries of a direct current radio set or the corresponding power sources of an alternating current radio set.

Figure 12:
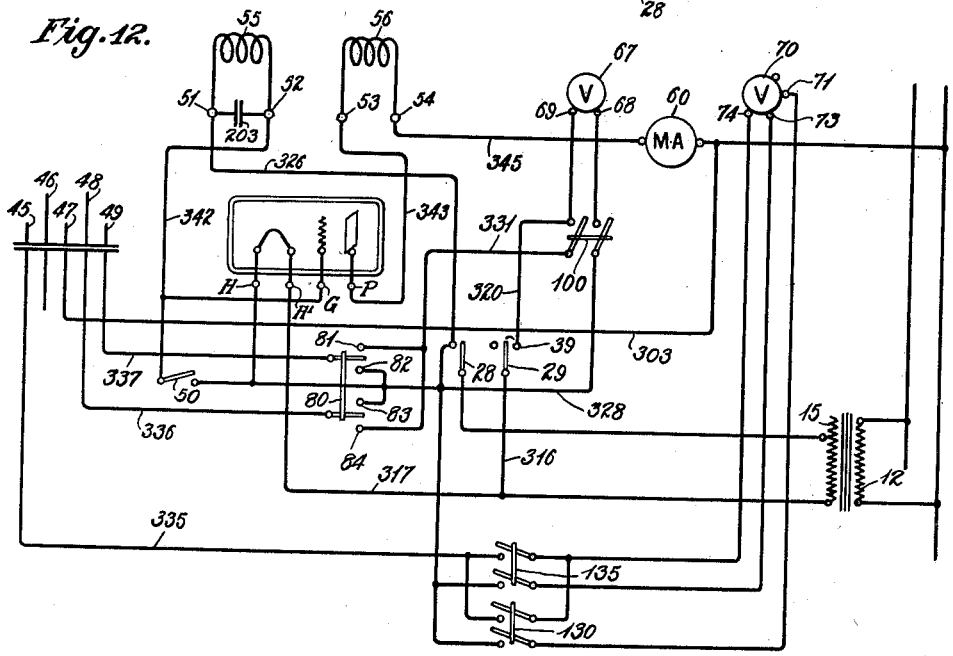
Fig. 12 is a diagram of the circuit for "testing tubes from radio apparatus"

I shall now proceed to describe this test, referring to Fig. 12. The power transformer is in this case not connected to any source of alternating current and the power switches are not plugged so that the connection between primary and secondary of the power transformer is severed, whereas the contact over members 29 and 39 of the power switches in their inoperative position, from 316 to 320 is established as indicated in Fig. 12. The tube to be tested is put into one of the tube testing sockets and the five-prong plug 18 is plugged into the tube socket of the radio device which is to supply the power for this test. In case the tube socket of the radio device should be of the type having four contacts, an appropriate adapter will have to be used between plug 18 and these tube sockets. In Fig. 12 it is presumed that four terminal tubes are being tested. Socket contact H is now connected over contact 83 of the pole changer 80 to terminal 48 leading to the five-prong plug. Socket contact H' is connected over 317, 316, members 29 of the power switches, instrument switch 100, and contact 81 of pole changer 80 to terminal 49. Instrument switch 100 has to be closed for this test and it completes the circuit as described above. The plate circuit is the same as described before with the difference that it is not supplied from the power transformer, but over connection 303 and terminal 47 of the five-prong plug, from the radio set. The prong corresponding to terminal 46 is not used in this circuit, as it is not connected to the tube testing sockets. Terminal 45 and prong 45' connect the separate filament supply of an alternating current radio set to the testing set with the contacts 131 and 137 of the instrument switches 130 and 135, the contacts 133 and 139 of these switches being connected to socket contact H so that the alternating current filament voltage can be measured by means of volt meter 70. The voltage of a direct current filament can be measured with volt meter 67 over $H_1$, 317, 316, 29, 320 on the one side and over 335, 100, 332, $H^2$ on the other side. Prong 45 which corresponds to the separate filament lead of alternating current tubes is of course only utilized when power is supplied from an alternating current set, no adapter being used in connection with the five-prong plug.

With this circuit the oscillation and emission currents can be measured in the same manner as described above by means of milliampere meter 60 and stop oscillation switch 50, whereas the direct current filament voltage is measured with volt meter 67, or the alternating current filament voltage with volt meter 70, instead of measuring the line voltage by means of switch 125. The pole changer 80 is used for obtaining the proper reading on the direct current volt meter in case the poles of the supplying radio set should not correspond to the volt meter poles.

*Analyzing tests.*—In order to operate a radio device properly, it is very important to measure the characteristic voltages and currents. It is, however, often very inconvenient or even impossible to connect measuring instruments to certain points or conductors of a radio device to be tested, these points being frequently inaccessible. For this reason, and for reasons of general convenience I have found it advantageous to employ for this type of tests the following method which forms part of my invention:

Instead of connecting the testing device with leads to points corresponding to tube contacts, of the apparatus to be tested, I transpose the respective tube under operative conditions from the apparatus to the testing device, upon which permanent circuits establish the necessary testing connections to the tube terminals and therewith to the apparatus to be tested. The arrangement shown in Fig. 13 may be used for this purpose. Five-prong plug 18 is inserted in the tube socket of a radio set in order to obtain the desired readings corresponding to that particular socket or tube. The tube itself is placed in the load socket 43 of the testing device, if the readings are to be made under load. If it is not inserted in the socket, readings without load will be obtained. In this manner, the particular tube is transposed for testing purposes from the radio device to the testing device. If the radio device to be tested operates with alternating current supply and so called "heater" tubes ("UY" tube), the plug 18 will be connected directly to the tube socket of the radio device to be tested and the filament plate and grid terminals are thereby independently brought to my testing device, as shown in Fig. 13, which shows as an example the testing of an apparatus with this type of tubes.

If the device to be tested uses 4 contact tubes ("UX" type), appropriate adapters connecting the cathode terminal with one filament terminal have to be used. The filament circuit will be independent in the first case, as shown in Fig. 13, but closed over the cathode when an adapter is used, as indicated with dotted lines in Fig. 13.

Figure 13:
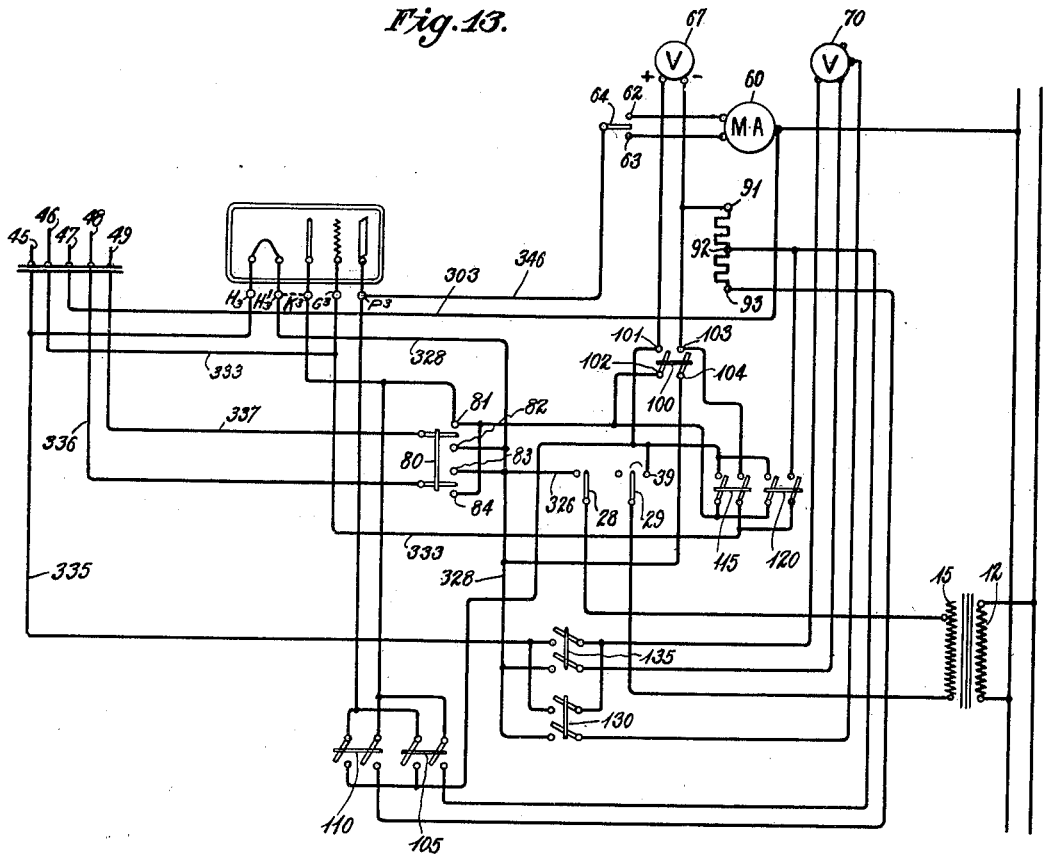
Fig. 13 is a diagram of the circuit for the "analyzing test"

The connections established by this circuit are shown in Fig. 13, which will be easily understood by anyone skilled in the art, if traced with reference to Fig. 1.

The taking of the various measurements will now be explained. The filament voltage is obtained in the case of alternating current radio sets by operating switch 130 or 135, according to the voltage range. In the case of direct current radio sets, switch 100 is used. In either case, the values for "load" are obtained if the tube is inserted in the load socket and values "without load" if it is not inserted.

The grid voltage is obtained by operating switches 115 or 120, according to the voltage range. These readings will give the actual grid voltage from cathode to grid or from filament to grid. The pole changer 80 is operated in order to obtain the correct pole connections for volt meter 67. The impossibility of obtaining a reading will indicate an open grid circuit, except where a grid condenser is in series with the radio grid circuit.

The plate voltage is obtained by operating switches 105 and 110 according to the voltage range, and the plate current may also be measured during taking of the plate voltage under load, that is, with the tube inserted in the load socket of the testing device.

*Continuity testing*.—Continuity tests in order to detect whether a given circuit is open or closed can be made in the two following manners, referring to Fig. 1. When using A. C. prongs 49' and 45' of the five-prong plug 18 are joined by any convenient means, as for instance, an adapter as used for making analyzing tests. A probing lead is connected to pin socket 185 and a second probing lead to pin socket 187. Testing current is obtained by connecting the power transformer to a commercial low tension alternating current supply over receptacle 1 and protective resistance 4 and by closing instrument switch 135 and one of the rejuvenating switches 150 or 160. By utilizing the rejuvenator switch in this manner, two voltages are available for this test. A circuit is now established from pin socket 187 over the contacts 29 and 39 of the power switches to terminal 20 of the transformer secondary, and from tap 26 or 27 of the secondary over 311 or 312 to one of the rejuvenator switches 150 or 160 over switch 135 to terminal 73 of volt meter 70. From there again over switch 135 and prongs 45' and 49', 337, pole changer 80 and over 331 to pin socket 185 and to the second probing lead. Volt meter 70 will indicate the voltage supplied from the power transformer secondary if the circuit to be tested is closed.

When using D. C. the oscillator coil 19 is removed, the test probes are inserted in pin sockets 53 and 54, a tube is put in testing socket 41, one of the power switches 31 to 36 is closed, the power transformer is connected to an alternating current supply by plugs 2 and 3, and the milliammeter switch 61 is closed. A circuit is now established from pin socket 53 over 343 to plate contact P', thence from plate to filament of the tube, over 317, 316, 29, 38, and 306 to power line 7, and from the other power line 6 over 301, milliammeter 60, switch 61, wire 345 to pin socket 54. The filament of the tube in socket 41 is energized by the circuit described under "Testing of electron discharge apparatus". Any type of tube can be used for this purpose, but a '80 type rectifier is recommended.

Figure 15:
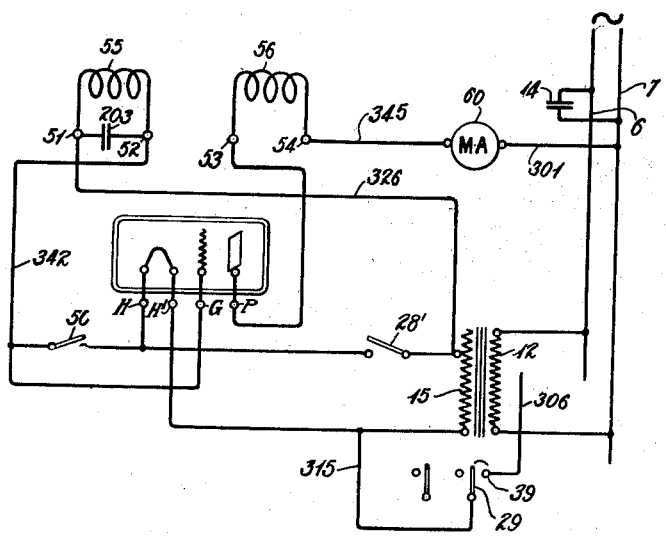
Fig. 15 is a diagram of the circuit of the "modulated radiator" with alternating current supply.

*Modulated radiating*.—It is in many cases desirable to have a source of modulated radio waves, as for instance, for ascertaining whether or not a radio receiving device is operative at a time when no other radio wave is available. My servicing device provides a source of electro magnetic waves which may receive energy either from a commercial alternating current supply or from the batteries of a direct current radio apparatus. Fig. 15 shows the respective circuit for supply from an alternating current source and will be readily understood if traced in connection with Fig. 1. The oscillating circuit is the same as that described in connection with the tube testing circuit, and the oscillator consisting of coils 55 and 56 will in this case serve as wave radiator or antenna. The high frequency wave radiated by this circuit will be modulated by the commercial alternating current of 25 or 60 cycles with which the filament is supplied, so that a distinctive sound will be received in a receiving device tuned to this high frequency wave. As in the circuit shown in Fig. 11, the oscillator 19 is plugged into the oscillator contacts 51, 52, 53, 54, an oscillating tube put in a tube testing socket and a power switch corresponding to the tube voltage closed, in order to supply the oscillating tube with the proper filament voltage and to close the plate circuit.

Figure 16:
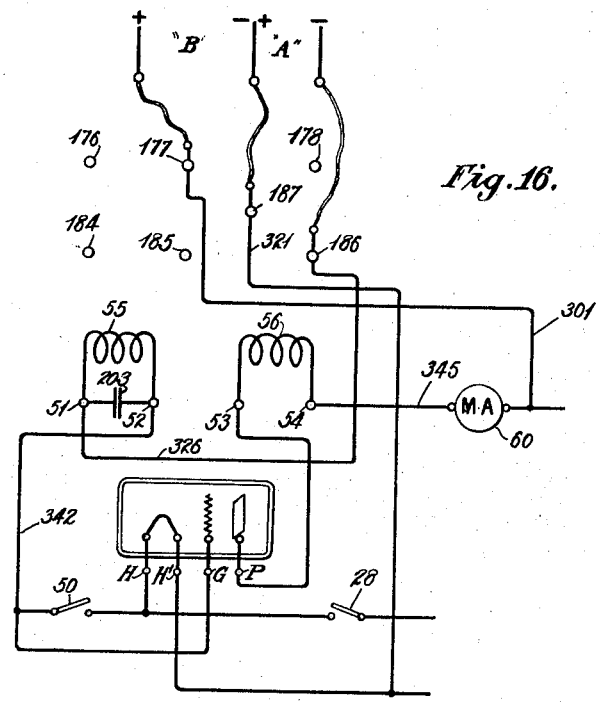
Fig. 16 is a diagram of the circuit of the "modulated sender" with direct current supply.

If no alternating current source is available, the sender can be supplied from the batteries of a direct current radio device in the following manner, referring now to Fig. 16. The power transformer is disconnected and the power switches in their inoperative position, for example, 28 are open. Pin socket 187 is connected to the positive terminal of the "A" battery of the radio device, pin socket 186 to the negative terminal of the "A" battery and pin socket 177 to the positive "B" battery terminal. The negative "B" battery terminal may be joined to either the positive or negative "A" battery terminal. In Fig. 16 the negative "B" battery terminal is indicated as joined to the positive "A" battery terminal. The oscillator 19 is again connected to its contacts 51, 52, 53, 54 and a tube inserted in one of the tube testing sockets. The operation of this circuit as shown in Fig. 16 will be comprehensible to anyone skilled in the art. In order to modulate the constant high frequency wave radiated by this circuit, for making reception possible, the circuit is keyed by operating stop oscillation switch 50. It will of course be understood, that my oscillator is not a broadcaster, as the radiation is confined to a small area surrounding the inductance coils, but this area is sufficient to reach a radio device located within a few feet from the oscillator, in order to supply the device with energy for testing purposes.

*Balancing condensers*.—It often becomes necessary to "align" or "balance" variable condensers, that is, to adjust them in such a manner that a certain position of the movable condenser plate corresponds to a certain capacity or to a certain condition of the high frequency circuit associated with the condenser. This necessity arises especially with respect to the condensers of cascaded tuned radio frequency circuits with several stages of amplification, where under certain conditions the movable parts of these condensers may be joined and operated with a common controlling means, as is well known to those skilled in the art. In order to obtain proper operation in such cases the condensers must be joined in positions which correspond to resonance of their respective circuits to a certain frequency. My servicing device permits such adjustment by using the following method which is part of the present invention.

I provide an oscillating circuit generating a constant frequency, with a current indicating means in its plate circuit, and supply the plates of the radio device from the same source which feeds the plate circuit of the standard constant frequency circuit. The tubes in the radio receiver device, the output stage and in the testing socket of the instrument are capable of oscillating. Thereby the tubes of tuned stages of the receiver are sensitive to the resonance effects caused by a variation of the condensers that are aligned, a critical excitation taking place at the frequency radiated from the auxiliary oscillator of the instrument. The current indicating means will show an increased drain upon the common plate current source, as soon as a condenser circuit is in resonance with the standard circuit. By tuning the condenser circuits one after the other to the standard circuit in this manner, the condenser positions which correspond to equal tuned frequencies can be determined and the condensers aligned accordingly.

This method is carried into effect in my servicing device in the following manner, referring now to Fig. 17:

The left part of Fig. 17, drawn in thin lines, represents part of a conventional radio receiving device omitting everything except the most essential parts. 401 are the condensers and 402 the tubes of the tuned radio frequency circuit, and 403 is the first tube of the audio circuit, supposed to consist of two stages. The tube 404 of the second, or last stage of the audio circuit containing the loud speaker unit LS, is removed from the radio device and replaced by five-prong plug 18, and the tube put instead into the load socket of the servicing device. In this particular case it is presumed that tubes with four contacts are used, and plug 18 has therefore to be provided with an adapter joining leads 45 and 49, as indicated in Fig. 17. It is of course understood that the radio circuit shown in this figure is merely an example and that the method described above can be analogously applied to any other tuned circuit.

In order to establish this condenser balancing circuit, coil 19 is inserted in its contacts. A tube 405 of similar filament voltage to that of the tube which has been transferred from the radio set to one of the load sockets is inserted in one of the testing sockets. The instrument switch 100 is then closed in order to complete the circuit which will otherwise be well understood by tracing it with reference to Fig. 1.

The circuit containing tube 405 will now oscillate with constant frequency, and the tuned radio frequency circuits can be brought into resonance with this standard circuit, resonance being indicated by a deflection of milliampere meter 60, carrying a current which is sufficiently amplified by the audio stages. The condensers can now be adjusted accordingly.

It will be seen that the condensers of all the radio frequency circuits can be aligned in this manner, without changing any connections, because the ampere meter will indicate resonance of either circuit with the standard circuit, if this circuit draws heavier on the common current supply in consequence of resonance with the standard oscillation circuit to which it is coupled.

*Rejuvenating.*—The method of rejuvenating electron discharge apparatus with thoreated filaments by subjecting the latter for a certain period to a so-called "flashing" voltage which is higher than the normal filament voltage, and then for a longer period to a somewhat lower "cooking" voltage, is well known in the art. I have incorporated in my servicing device a circuit which permits the rejuvenating of tubes in a simple manner, by using commercial alternating current. The rejuvenating circuit includes various parts of my servicing device which are also utilized in other circuits, and in addition, special rejuvenator switches which are part of the present invention and which I shall first describe, having now reference to Fig. 9 and Fig. 10.

Figure 14:
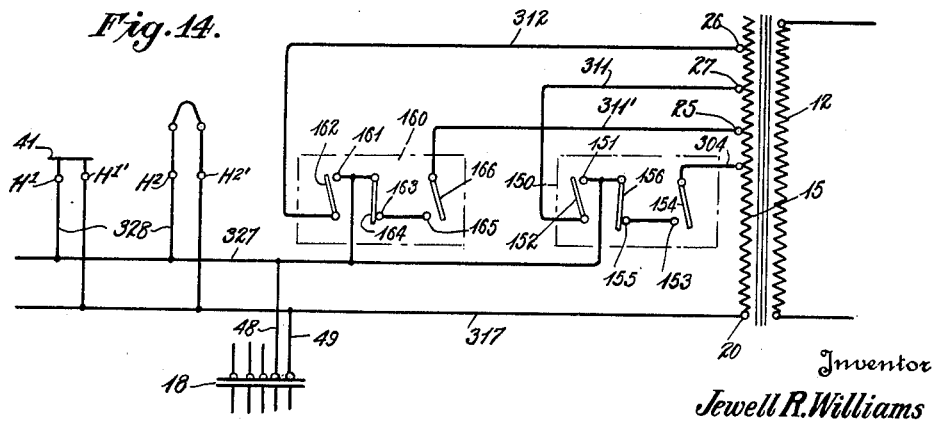
Fig. 14 is a diagram of the rejuvenator circuit.

In its general arrangement this switch is similar to conventional jack switches, having a U-shaped support 350 with mounting means 360 of any convenient form in order to secure it to a panel or other support, as indicated at 369. Fastened upon support 350 are three spring contacts 152, 154 and 156 of the peculiar shape shown in Fig. 10, and fixed contacts 151, 153 and 155. These contacts and the corresponding contacts of Figs. 1 and 14 are identified with the same numerals. The contacts are fastened to the support with screws 354 or similar means, but insulated therefrom by suitable insulating spacers 353. The contacts have terminals 361, 362, 363, 364, 365 and 366. A special plunger 359 of insulating material has a suitable knob or handle 351 and a shaft 352 with a notch 353 around its periphery.

The operation of this switch is as follows: If plunger 359 is not inserted at all, contacts 155 and 156 are closed and contacts 153 and 154, and 151 and 152 respectively, are open. By inserting plunger 359 until notch 353 catches upon the curved part 367 of spring contact 156, contacts 153 and 154 will be closed by the straight part of the plunger, whereas the two other contacts remain in the same position, namely, 155 and 156 closed and 151, 152 open. By pressing plunger 359 as far down as possible, contacts 153 and 154 remain closed, whereas contacts 155, 156 will be opened by the straight part of the plunger above the notch and 151 and 152 will be closed by the tip of the plunger. It will be seen from the foregoing that three definite combinations of switching positions correspond to three definite plunger positions. This, and the fact that a switch of this kind requires comparatively little space and has no current carrying parts on the outside of a panel make this switch especially suitable for my rejuvenating circuit which will now be described.

Referring to Figs. 1 and 14, with corresponding numerals, 150 and 160 are two rejuvenator switches of the type described above. The connections of the elements or contacts of these switches have been explained before in connection with Fig. 1 so that the rejuvenator circuit according to Fig. 14 can be easily traced in the main circuit. Two corresponding groups of flashing and cooking voltages are shown in Fig. 1 and Fig. 14; it is however understood that more than two corresponding groups may be used.

In order to rejuvenate an electron discharge tube the transformer primary 12 is connected to an alternating current supply with plug 2 over protecting resistance 4 and the tube to be rejuvenated is inserted in one of the testing sockets according to its contacts, if necessary, with the aid of an adapter. The taps which are connected to the rejuvenator switches correspond to the proper flashing and cooking voltages of the tubes to be rejuvenated. Plunger 359 is now inserted as far as possible into the rejuvenator switch corresponding to the tube voltage. This corresponds to the following position of the contacts, referring now by way of example to switch 150: 151 and 152 closed, 153, 154 closed, and 155, 156 open. As will be seen from Fig. 14 the flashing voltage is now applied to the tube. After a certain time, plunger 359 is pulled back until its notch catches on curved part 367 of contact 156, and the contacts will now have the following positions, again referring to switch 150 and Fig. 14: 151, 152 open, 153, 154 closed, 155, 156 closed. In this position the cooking voltage is applied and by removing the plunger entirely, the transformer taps are again disconnected. The other rejuvenator switch 160 is operated in a similar manner. It is of course understood that any number of rejuvenator switches and parallel test sockets could be employed.

It is also possible with my servicing device to rejuvenate at the same time a plurality of tubes mounted upon a convenient receptacle as, for instance, a panel with a number of tube sockets connected in parallel. Such a receptacle or panel can be connected to my rejuvenator circuit by means of contacts 48 and 49 of my five-prong plug 18. As can be seen from Fig. 1, prong 48' is connected over 83, 328 and 158 to a point of the rejuvenator switch corresponding to one filament contact and prong 49' is connected over 81, 331, 102, 101, 324, 320, power switches and 316 to the end terminal 20 of the transformer secondary 15 if instrument switch 100 is closed.

*Bridging of open stages of audiofrequency.*—My servicing device contains also a complete audiofrequency stage and I am therefore able to bridge a defective audiofrequency stage of a radio communication apparatus. This may, for instance, be convenient or desirable when a defective audiofrequency transformer has been detected and it is desired to continue the test and to see whether there is any other defect. This audiofrequency stage is used in the following manner: The five-prong plug is inserted into the socket of the radio apparatus which precedes the open transformer and the tube from this socket is placed in the load socket of my device. The grid lead of the radio socket following the open transformer is then connected to pin socket 173 and pin socket 171 is connected to the positive pole of the plate supply. By tracing this circuit in Fig. 1 it will be seen that a complete audiofrequency stage is now formed by the audiotransformer 190 of my device, in cooperation with the tube in the load socket 43.

*Inductive output.*—The audiotransformer 190 of my servicing device can be used for the connection of a radio receiving device with a loud-speaker by connecting pin sockets 171 and 172 to the output terminals of the radio receiving device and by connecting pin sockets 173 and 174 with the terminals of the loud-speaker.

*Condenser-choke coil output.*—My servicing device contains also a so-called condenser choke coil output for the operation of a loud-speaker from the output terminals of a radio receiving device. In Fig. 18, 411, 412 and 413 are negative "A" battery, and radio output terminals respectively, of a radio receiving device. By connecting pin sockets 179, 173 and 174 to 411, 412 and 413, respectively, and by connecting the terminals of the loud-speaker 415 to pin sockets 180 and 181, the circuit shown in Fig. 18 is obtained, which can easily be traced in Fig. 1 and which will be recognized by anyone skilled in the art as a so-called condenser choke coil output.

*Condenser tests.*—My servicing device contains a number of fixed condensers which are connected to pin sockets in such a manner that they can be externally used as, for instance, for making a so-called condenser break down test. For this purpose pin socket 174 is connected to one plate of the condenser 420 to be tested and to one pole of a battery 421, and pin socket 181 is connected to the other plate of the condenser to be tested, as shown in Fig. 19. By touching pin socket 181 with a lead 422 from the other pole of the battery the condensers 420 and 201 are charged, and if the condenser 420 to be tested is able to hold a charge the volt meter will indicate a voltage when switch 100 is closed. The fixed condensers of my servicing device can be used to obtain various capacities by connecting them to external apparatus in series or in parallel by means of pin sockets 174, 181, 182, 183, and 184.

*External use of meters.*—The instruments of my device can be used externally in the following manner:

The milliampere meter can be connected to external apparatus by means of pin sockets 177 and 178 and the proper range of the instruments can be brought into operation by means of switch 61.

The direct current volt meter is connected to pin sockets 187, and 185 or 186, according to the voltage to be tested and the instrument is inserted by closing one of instrument switches 100, 105 or 110.

The alternating current volt meter can be connected to external apparatus by means of pin sockets 185 and 186 and by operating switches 130 or 135, according to the voltage to be measured. For the external use of this instrument it is also necessary to connect prongs 45 and 49 of the five-prong plug 18 with a suitable adapter in order to establish the necessary connection to pin socket 185.

The voltage of an alternating current outlet can be measured by connecting my device to the source by means of receptacle 1 and by operating switch 125.

*Rheostats.*—My servicing device contains also two variable resistances 197 and 198 of any desirable value, as for instance a small resistance of perhaps 30 ohms and a large resistance of approximately 500,000 ohms. These resistances are available by means of pin sockets 175, 176 and 174 and will be very convenient for various processes.

Having described my invention, I claim:

1. In a circuit for testing electron discharge apparatus having cathode, auxiliary element and anode, a source of low frequency alternating current, a transformer connected to said source and supplying the heating current for said cathode, a circuit including said anode, an impedance comprising an inductance element, an ammeter and said transformer, a second circuit including said auxiliary element, a second impedance comprising a second inductance element and said transformer designed to induce an oscillating condition, and means for eliminating said second impedance from said second circuit to terminate said oscillating condition.

2. In a circuit for the generation of high frequency currents, a source of commercial low frequency alternating current, a primary winding connected to said source, a secondary winding inductively coupled and conductively connected to said primary winding, an electron discharge apparatus having heated cathode, auxiliary electrode and anode, a heating circuit for said cathode including said secondary winding, an anode circuit including an impedance comprising an inductance element and said primary winding, a circuit running from said auxiliary electrode over an impedance comprising a second inductance element to said secondary winding, and means for interrupting the generation of high frequency current by short circuiting said last-mentioned impedance.

3. In a circuit for the generation of high frequency currents, a source of commercial low frequency alternating current, a primary winding connected to said source, a secondary winding inductively coupled and conductively connected to said primary winding, an electron discharge apparatus having heated cathode, auxiliary electrode and anode, a heating circuit for said cathode including said secondary winding, an anode circuit including an impedance comprising an inductance element and said primary winding, a circuit running from said auxiliary electrode over an impedance comprising a second inductance element to said secondary winding, and means for starting at will the generation of high frequency current, by establishing and interrupting a direct connection between said cathode and auxiliary electrode.

4. In a portable testing device for testing the audion tubes of radio communication apparatus, a socket for receiving an audion tube comprising a cathode, auxiliary element and anode, means for energizing at least said cathode and anode from energy sources in said radio communication apparatus, coupling members in the circuits between said cathode and grid and cathode and anode designed to cause an oscillating condition of said tube, an electrical meter in circuit with said anode, and switch means for interrupting said oscillating condition to obtain comparative readings on said meter for oscillating and non-oscillating conditions of the audion tube.

5. In a portable testing device for testing the audion tubes of radio communication apparatus, a socket having terminals for receiving an audion tube comprising a cathode, auxiliary element and anode, means for energizing at least said cathode and anode from energy sources in said radio communication apparatus, comprising flexible conductors connected at one end to said terminals of said socket and at the other end to a multiple contact plug adapted to be inserted in said radio communication apparatus, coupling members in the circuits between said cathode and grid and cathode and anode designed to cause an oscillating condition of said tube, an electrical meter in circuit with said anode, and switch means for interrupting said oscillating condition to obtain comparative readings on said meter for oscillating and non-oscillating conditions of the audion tube.

6. In a portable testing device for radio apparatus, a transformer having a primary winding and a secondary winding, a source of alternating current connected to said primary winding, a contact plug having two terminals thereof connected to each other in the circuit of said secondary winding, an alternating current voltmeter in said circuit, an instrument switch for connecting said voltmeter in said circuit, a rejuvenating switch in said circuit, two pin sockets, and probing contacts extending from said pin sockets designed to test circuits for continuity by the indication of said voltmeter.

7. In a portable testing device for radio apparatus, a transformer having a primary winding and a tapped secondary winding, a source of alternating current connected to said primary winding, a contact plug having two terminals thereof connected to each other in the circuit of said secondary winding, an alternating current voltmeter in said circuit, an instrument switch for connecting said voltmeter in said circuit, a plurality of rejuvenating switches in said circuit connected to corresponding taps of said secondary winding, two pin sockets, and probing contacts extending from said pin sockets designed to test circuits for continuity by the selective indication of said voltmeter of the tapped voltages across said secondary winding in accordance with the selective closure of one of said rejuvenating switches.

8. The method of aligning a plurality of variable condensers of tuned high frequency circuits containing electron discharge apparatus which method consists in supplying the anodes of said circuits together with the anode circuit of an auxiliary oscillating circuit of fixed frequency from the same source of current, determining resonance of each of said tuned circuits with said auxiliary circuit, and interrelating the condensers in the positions corresponding to resonance.

9. The method of aligning a plurality of variable condensers in a series of subsequent stages of coupled tuned high frequency circuits containing electron discharge apparatus, which method consists in supplying the anode of the last electron discharge apparatus of said series and the anode circuit of an auxiliary oscillating circuit of fixed frequency from the same source of current, determining resonance of each of said tuned circuits with said auxiliary circuit by means of an ammeter in said common current supply and interrelating the condensers according to their positions corresponding to resonance.

10. In an apparatus for aligning condensers of a series of coupled tuned high frequency circuits, an amplifying circuit comprising electron discharge apparatus, for the amplification of the current of said tuned circuits, an auxiliary oscillating circuit consisting of an electron discharge apparatus having a heated cathode, control electrode and anode, a control electrode circuit including an impedance, a connection between the anode of said auxiliary oscillating circuit and the anode of the discharge apparatus of the last stage of said amplifying circuit, a second impedance inserted between said anodes, a common current supply for both anode circuits, and current indicating means in said common supply.

11. In an apparatus for aligning condensers of a series of coupled tuned high frequency circuits, an amplifying circuit comprising electron discharge apparatus, for the amplification of the current of said tuned circuits, an auxiliary oscillating circuit consisting of an electron discharge apparatus having a heated cathode, control electrode and anode, a control electrode circuit including an impedance, a connection between the anode of said auxiliary oscillating circuit and the anode of the discharge apparatus of the last stage of said amplifying circuit, a second impedance inserted between said anodes and coupled with said first impedance, a common current supply for both anode circuits, and current indicating means in said common supply.

12. In a device for the reconditioning of electron discharge apparatus, a current source with taps corresponding to a group of flash voltages and a group of cooking voltages and a neutral tap, means for receiving a plurality of said discharge apparatus having two contact groups corresponding to the terminals of the heated element of said discharge apparatus, one of said groups being connected to said neutral tap, selector means each having a contact connected to a flash tap, a contact connected to a cooking tap and two selector switches connected to each other and to the other of said contact groups, each of said selector switches being adapted to connect with a corresponding contact while the other is disconnected therefrom, and disconnecting switches interposed in the tap connections of the contacts which are normally in contact with its switching means.

13. In a device for testing radio communication apparatus containing audiofrequency circuits having electron discharge apparatus, a plurality of testing circuits including an audiofrequency transformer, and receiving means for electron discharge apparatus, said transformer and said electron discharge apparatus forming an audiofrequency amplification circuit, and means for inserting said audiofrequency circuit in place of an inoperative circuit of the same kind of said radio communication apparatus.

14. In a portable testing device for radio apparatus, a plurality of testing and conditioning circuits including an audiofrequency transformer with a primary winding and a secondary winding, terminals for said windings, a tube socket having contact terminals, a plurality of flexible conductors connected at one end to said contact terminals and at the other end to a multiple contact plug, said contact plug adapted to be inserted in a socket of a radio receiver preceding a defective transformer, and the displaced tube adapted to be inserted in said tube socket, internal connections between said transformer and said conductors, and leads extending from the winding terminals of the transformer for completing the operative connection of the apparatus.

JEWELL R. WILLIAMS.